Figure 3:
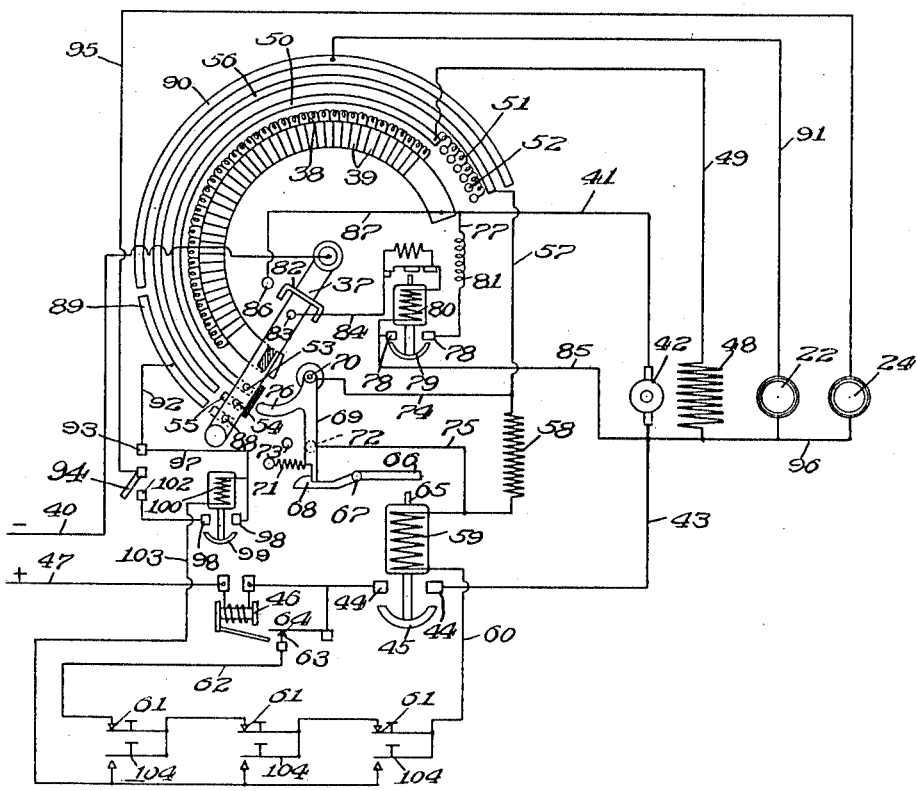

H. H. CUTLER.
CLUTCH AND CONTROLLER FOR PRINTING PRESSES.
APPLICATION FILED APR. 18, 1904.
1,120,375.
Patented Dec. 8, 1914.
4 SHEETS—SHEET 1.
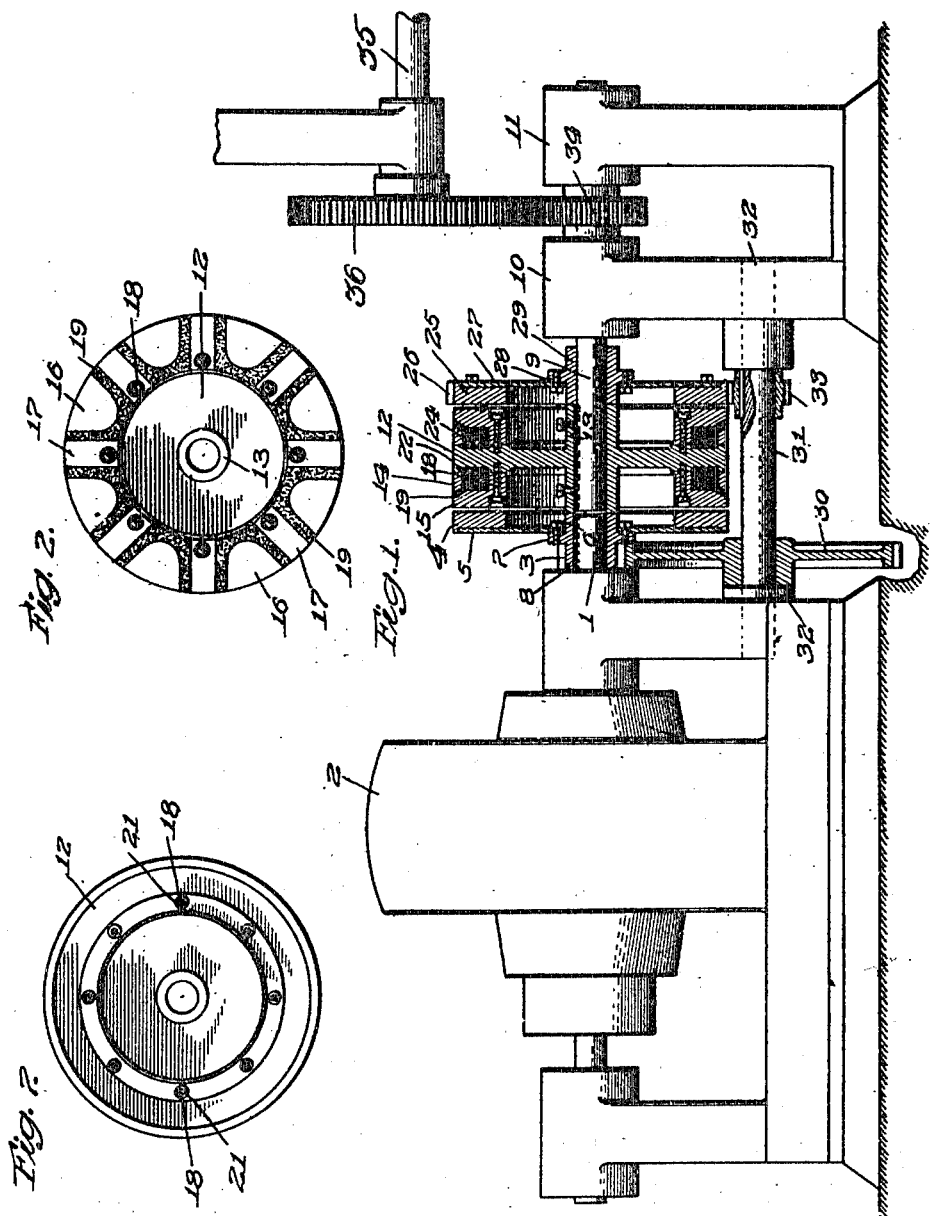

H. H. CUTLER.
CLUTCH AND CONTROLLER FOR PRINTING PRESSES.
APPLICATION FILED APR. 18, 1904.

1,120,375.

Patented Dec. 8, 1914.
4 SHEETS—SHEET 2.

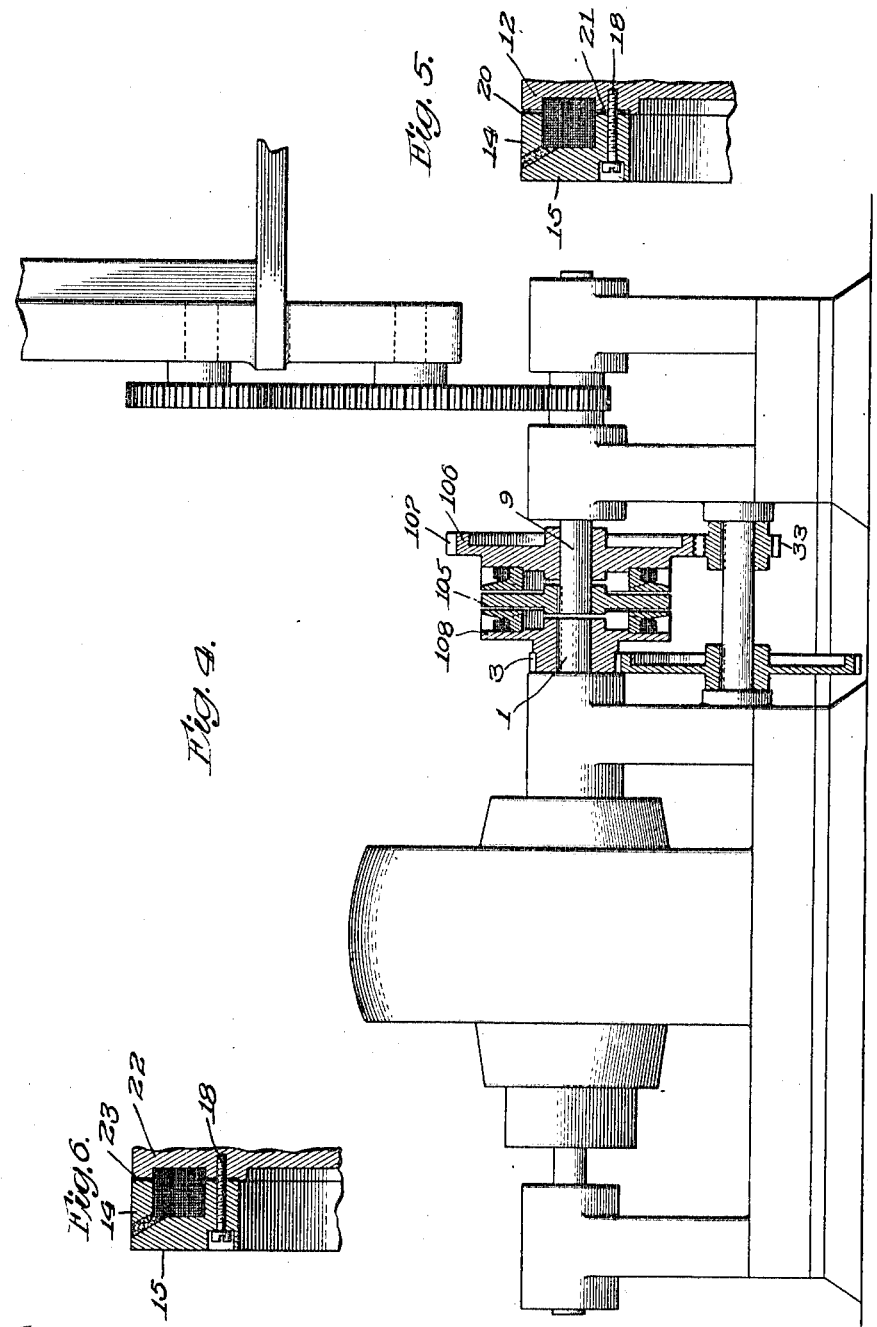

H. H. CUTLER.
CLUTCH AND CONTROLLER FOR PRINTING PRESSES.
APPLICATION FILED APR. 18, 1904.
1,120,375.
Patented Dec. 8, 1914.
4 SHEETS—SHEET 4.
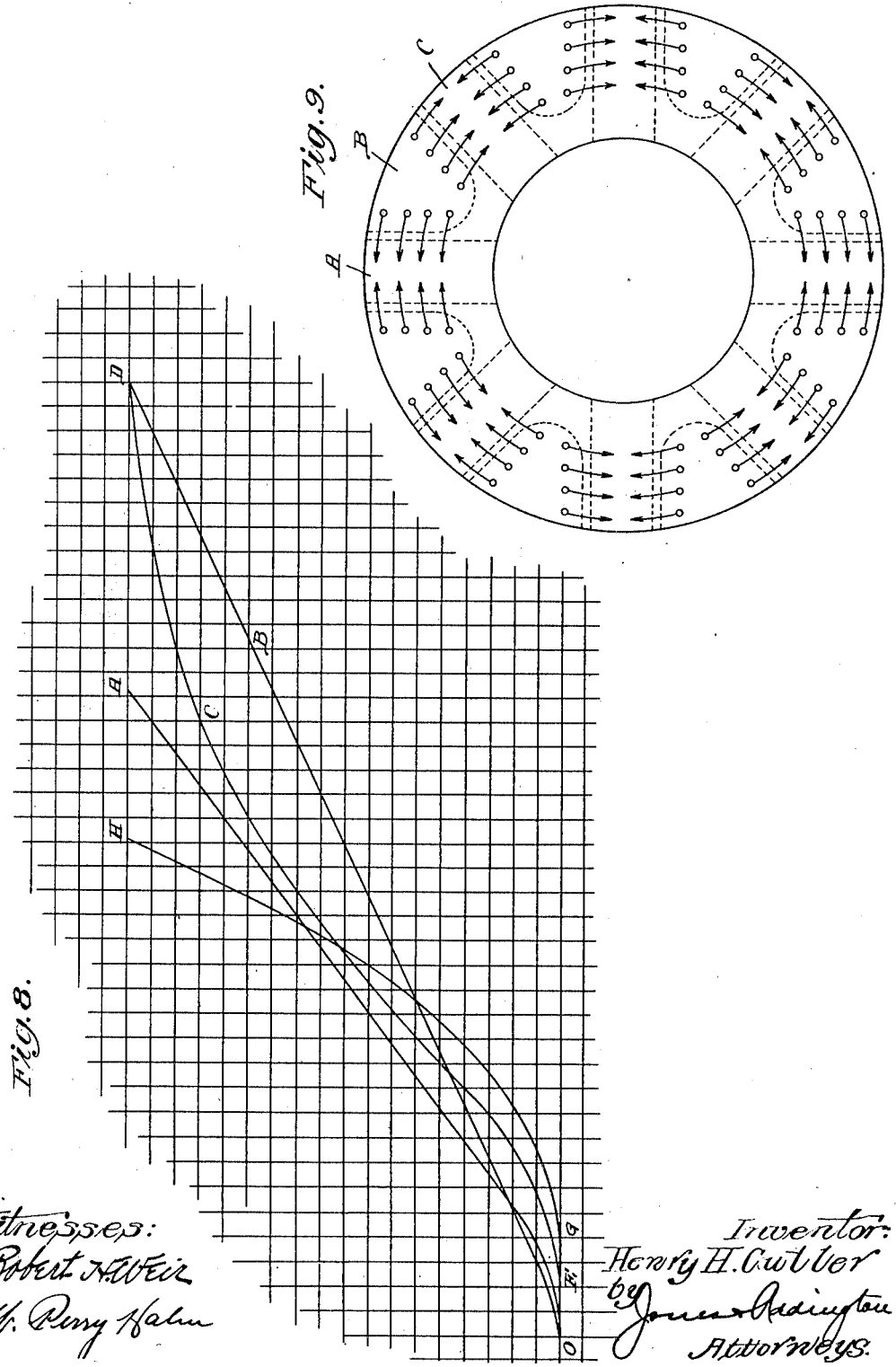

UNITED STATES PATENT OFFICE.

HENRY H. CUTLER, OF MILWAUKEE, WISCONSIN, ASSIGNOR TO THE CUTLER-HAMMER MANUFACTURING COMPANY, OF MILWAUKEE, WISCONSIN, A CORPORATION OF WISCONSIN.

CLUTCH AND CONTROLLER FOR PRINTING-PRESSES.

1,120,375.  Specification of Letters Patent.  Patented Dec. 8, 1914.

Application filed April 18, 1904. Serial No. 203,733.

*To all whom it may concern:*

Be it known that I, HENRY H. CUTLER, a citizen of the United States, residing at Milwaukee, in the county of Milwaukee and State of Wisconsin, have invented new and useful Improvements in Clutches and Controllers for Printing-Presses, of which the following is a full, clear, concise, and exact description, reference being had to the accompanying drawing, forming a part of this specification.

My invention relates to magnetic clutch power transmitting apparatus, my object being to provide improved means whereby power may be transmitted from suitable driving mechanism to any desired driven mechanism in an efficient and economical manner.

In accordance with my invention, I employ a magnetic clutch or accelerator, which is interposed between the driving mechanism and the driven mechanism, this clutch being constructed and arranged for operation so that the load may be readily connected with the driving motor and efficiently operated in connection therewith.

In an application filed by me August 5th, 1903, Serial No. 168,388, I have described and claimed an improved form of magnetic clutch or accelerator comprising a primary or inducing member and a secondary or induced member, one of which is adapted to be connected with the driving mechanism and the other with the driven mechanism, whereby through the energization of the clutch the driven part may be caused to rotate at any desired speed equal to or less than that of the driving part. In this clutch I utilize the effect of induction and also the effect of frictional contact between the driving and driven members to effect the acceleration of the driven member. Due to the peculiar and novel construction of this clutch the energizing current when admitted to the winding of the clutch does not, as in the case of ordinary magnetic clutches, cause the driving and driven parts to be forcibly gripped and clutched together, but on the contrary the driven member is gradually accelerated in speed until eventually it is brought to the full speed of the driving part if desired. This gradual acceleration is accomplished principally for two reasons:

First. Because the clutch is so constructed that considerable inductance is developed therein, so that the energizing current does not bring the magnetic field to full strength immediately, as is the case with the ordinary magnetic clutch, but causes the strength of the magnetic field to gradually increase until it reaches its maximum, thereby exerting a gradually increasing torque upon the driven member.

Second. Because the combined inductional and frictional effect of the driving member upon the driven member causes the driving member to exert upon the driven member a torque which is so proportioned as to cause a gradual acceleration.

The first effect above mentioned is accomplished by constructing the field magnet, which constitutes the inducing member of the clutch, so that the exciting coil will be entirely surrounded with iron, thus creating a large amount of inductance, so that when the circuit through the energizing coil is completed, the current through the energizing coil, and, consequently, the strength of the magnetic field in the inducing member is retarded; the sudden rising of magnetism to full strength, as in the case of ordinary magnetic clutches, resulting in extremely sudden acceleration, is entirely obviated in my clutch, due to the employment of this construction, which produces a large amount of inductance.

With respect to the second cause of gradual acceleration above mentioned, it is a well-known fact that if the driven member of a clutch be forced against the driving member with a practically constant force, as is the case with the ordinary magnetic clutch, the driven member accelerates in an incredibly short space of time, producing the undesirable jerk and shock to the machinery which is incident to the employment of these magnetic clutches and which has rendered their use prohibitive, except in very few and exceptional instances.

In the clutch of my invention the acceleration is due to the combined effects of friction and induction. The frictional effect is practically a constant force during the period of acceleration, while the inductional effect is a uniformly decreasing force during the period of acceleration; the resultant force is, therefore, a force which gradually decreases throughout the period of acceleration. Due to the employment of a force which gradually decreases throughout the period of acceleration, I am enabled to modify the law in accordance with which the ordinary magnetic clutch operates, in which the acceleration increases as the time, and with the clutch of my invention the acceleration increases in accordance with a different law and at a much slower rate. By thus employing a clutch whose rate of acceleration is comparatively small, I am enabled to gradually accelerate the driven member of the clutch, and accordingly I may apply the clutch to the driving of machinery which demands such gradual starting. The clutch of my invention further lends itself to this gradual starting principally for two addditional reasons:

Third. The wearing surfaces are supplied with anti-frictional material and are arranged to run in oil, thereby permitting a large amount of slipping between the members of the clutch without appreciable wear. In the ordinary magnetic clutch, any material amount of slipping between the two members will cause excessive wear and will result in the cutting of the contact faces of the clutch, thereby destroying the effectiveness of the clutch. In accordance with my invention, however, the contact faces are specially formed so as to permit the necessary amount of slippage to secure the gradual acceleration.

Fourth. The elements of the clutch are so constructed that a large amount of material may wear away, due to the slippage between the members, without destroying the effectiveness of the device. Polar surfaces are provided, which interpose a considerable thickness of material between the energizing winding and the contact face of the field magnet of the clutch, and, accordingly, a considerable amount of material may be worn away due to the friction, without in any manner affecting the operation of the clutch; likewise, the armature member of the clutch is so constructed that a considerable wearing away is permitted without in any manner affecting the operation of the device.

A further feature of the clutch of my invention is the provision of means whereby the driving and the driven members may be practically instantaneously separated when the circuit through the energizing cell is opened. It is a well-known fact that after the energizing current ceases the residual magnetism of the field magnet member will serve to attract the armature member for a definite period. It is desirable in practice that the primary member should release the secondary member at once upon the opening of the circuit through the energizing coil, and I have constructed the clutch of my invention so as to effectively accomplish this result. This result I attribute principally to two causes: First. Instead of employing a single magnetic circuit, as is the case with the ordinary magnetic clutch, I subdivide the field magnet into a large number of individual magnetic circuits, which aid in causing a rapid disappearance of the magnetism in the armature member when the magnetizing force is withdrawn. Second. I introduce into the magnetic circuit a reluctance in the form of a small air gap, or thin layer of non-magnetic material, or magnetic material of low permeability, so as to increase the total magnetic reluctance of the magnetic circuits. In the clutch of my invention I have found that even in the absence of this specially introduced magnetic reluctance, the residual magnetism will disappear in an extremely short time, that is, from one to six seconds. By the addition of the magnetic reluctance as above described, I am enabled to eliminate even this small time lag and to secure a practically instantaneous release. This air gap, or equivalent, need only be about one sixty-fourth of an inch thick, and therefore has a very slight effect in decreasing the power of the clutch. I preferably introduce this magnetic reluctance at a point in the magnetic circuit removed from the point of physical contact of the primary and secondary members of the clutch. In the mechanical construction of the clutch of my invention I provide a back plate, upon which are mounted two rings, one having inwardly extending pole pieces and the other having outwardly extending pole pieces, the pole pieces of the two rings interlacing and overlapping, the energizing coil being located in a channel formed by these three parts. In practice I preferably provide the special magnetic reluctance by interposing an air gap between the back plate and the rings carrying the pole pieces or by interposing a thin layer of non-magnetic material or magnetic material of low permeability between the back plate and these rings. By inserting the magnetic reluctance at this locality, the desired effect is produced without in any manner interfering with the effective action of the primary member upon the secondary member.

It will be seen that my invention is peculiarly applicable where it is desired to impart motion from a driving mechanism to a driven mechanism, and to provide that the driven mechanism may be instantaneously released from the driving mechanism at will. Due to the fact that the clutch of my invention causes a practically instantaneous release, the opening of the circuit through the energizing winding causes a practically instantaneous separation of the driving and the driven members.

ism will instantly disappear when the current is cut off from the energizing coils. This may be also accomplished as shown in Fig. 6, by placing, between the back plate 12 and the rings 14 and 15, a thin layer 23 of non-magnetic material or magnetic material of low permeability. In actual construction this thin strip need only be made one sixty-fourth of an inch in thickness, and therefore has a very slight effect in decreasing the power of the clutch. A primary member of similar construction is formed on the opposite side of the back plate 12 and carries an energizing winding 24, thereby, with the winding 22, forming a primary member having two magnetic fields. A secondary or armature member 25 adapted to be influenced by the winding 24 and having its periphery formed with gear teeth 26 is secured to the periphery of a steel disk 27, the inner edge of which is secured by means of bolts to a flange 28 carried upon the hub 29, rotatably mounted upon the shaft 9.

The pinion 3 is adapted to mesh with a gear wheel 30 keyed upon a shaft 31 mounted immediately beneath the clutch in journals 32, 32. Also keyed upon the shaft 31 is a pinion 33, which is adapted to mesh with the gear teeth 26 formed on the outer periphery of the armature 25. Mounted upon the shaft 9 between the journals 10 and 11 is a pinion 34, which is adapted to mesh with and drive the gear wheel 36 mounted upon the shaft 35 of the machinery to be driven.

In Fig. 3, the circuit arrangement and controlling apparatus for the above described device are shown. The contact arm 37 of the regulating resistance 38 is adapted to move over the segments or terminals 39, 39. The contact arm 37 is connected with one side 40 of the supply circuit, the end of the resistance 38 being connected by conductor 41 through the armature 42 of the motor, thence by conductor 43 to contacts 44, 44, adapted to be bridged together by the contact plate 45. The overload magnet 46 is included in series with the supply conductor 47, connected with the other side of the supply circuit. The shunt coil 48 of the motor is connected by conductor 49 with the contact segment 50, a resistance 51 subdivided into sections connected with the terminals 52, being also connected with said conductor and arranged at the extremity of the segment 50. The contact arm 37 carries a brush 53 adapted to engage the segment 50 and to sweep over the terminals 52 when the contact arm is moved to its extreme position in cutting out the resistance 38. A second brush 54 carried by the contact arm 37 is adapted to initially rest upon a dead contact 55 and be moved over a curved contact 56, the end of which is connected by conductor 57, through the resistance 58, with one terminal of the winding of a solenoid or magnet 59. The circuit then extends from the opposite terminal of the winding of the solenoid 59 through the conductor 60, through the push buttons 61, the conductor 62 and the contacts 63 and 64 of the overload magnet 46 to the conductor 47. The core of the solenoid 59 carries at its lower end the contact plate 45 and at its upper end a pin 65 adapted, when the core is attracted, to engage and move the latching lever 66, which is pivoted at 67 and which carries upon the end a hook 68 adapted to engage the end of a lever 69, pivoted at 70 and provided with a spring 71 which tends to move the end of said lever from the contact terminal 72 to the other contact 73. The contact 72 is connected by conductor 75 with the conductor 57 upon one side of the resistance 58 and the lever 69 is connected by conductor 74 with the conductor 57 upon the opposite side of said resistance, so that the lever 69 when resting upon the contact terminal 72 shunts or short circuits the resistance 58. The latching lever 66 serves initially to maintain the lever 69 in contact with the terminal 72. When the latching lever 66 is rocked by the pin 65 carried on the core of the solenoid 59, the lever 69 is released and the spring 71 moves the same out of contact with the terminal 72 and into contact with the terminal 73, thereby opening the shunt around the resistance and including said resistance operatively in circuit. The lever 69 carries a lateral arm 76 adapted to be engaged by the contact arm 37 when moved to the initial position, whereby the movement of the contact arm to the necessary position to cut in all of the resistance 38 serves to short circuit the resistance 58, the lever 69 being held in short circuiting position by means of the latching lever 66.

In parallel with the armature 42 of the motor, a conductor 77 is provided. The circuit through said conductor being normally opened at contacts 78, 78, which are adapted to be bridged together by the contact plate 79 carried upon the core of the solenoid magnet 80. A resistance 81 is provided in circuit with the conductor 77. Upon the contact arm 37 a contact bar 82 is mounted, which is insulated from the contact arm. A contact button 83 is connected by conductor 84 with one terminal of the solenoid 80, the opposite terminal thereof being connected by conductor 85 with the conductor 43. A contact button 86 is connected by conductor 87 with conductor 41. The buttons 83 and 86 are relatively insulated, but when the contact bar 82 is moved to engage the two buttons it electrically connects the same. The controller arm 37 is provided with a third contact brush 88, adapted to make contact with the two outer segments 89 and 90, My invention is also peculiarly applicable to that class of machinery in which it is desired to operate the driven mechanism at two or more distinct speeds, as, in this case, a pair of my magnetic clutches may be employed in connection with suitable gearing for securing the different speeds and the driving mechanism may be instantaneously disconnected through the agency of one of the magnetic clutches and gradually transferred to the influence of the other magnetic clutch in the desired manner. This feature of my invention lends itself peculiarly to the control of printing presses, turrets of battle ships, and the like, where it is desired at times to operate at a very slow speed and also to operate at a much higher normal speed. By employing a plurality of magnetic clutches, suitably associated, the driven mechanism may be caused to operate efficiently at any number of desired speeds.

My invention is equally applicable to that class of machinery wherein it is desired to operate the driven mechanism first in one direction and then in another, as in many classes of reciprocating machinery, such as small printing presses, planers and similar machine tools. By employing two magnetic clutches, made in accordance with my invention, and suitable gearing, the driving motor may be caused to operate the driven mechanism first in one direction and then in the other.

The above instances are cited merely to show the general applicability of my invention and are not intended to be an exhaustive enumeration of its various fields of utility.

For the purpose of fully disclosing the features of my invention, I have illustrated in the accompanying drawings several embodiments of my invention.

In the drawings Figure 1 is an elevation of the motor and the clutch, the clutch being shown in section; Fig. 2 is a face view of the primary member of the clutch; Fig. 3 is a diagrammatic view of the circuits employed; Fig. 4 is an elevation of a modification, the clutch being shown in section; Fig. 5 is a view of a modification of the clutch; Fig. 6 is a detail view of a portion of the back plate of the modification; and, Fig. 7 is a detail view of another modification; Fig. 8 is a comparative curve illustrating the torque developed by various clutches; Fig. 9 is a diagrammatic face view of a magnetic field of my clutch.

In the structure which I have worked out as being the preferred embodiment of my invention, upon the shaft 1 of the motor 2, a pinion 3 and one armature member 4 of a double magnetic clutch are suitably keyed. The armature member 4 in the present instance is of annular form and is secured to the periphery of a steel disk 5, the inner edge of which is secured by means of bolts 6 to a flange 7, carried upon the hub 8 of the pinion 3. The primary member of the double clutch is keyed upon a second shaft 9 mounted in alinement with the shaft 1 in suitable journals 10 and 11. The primary member of the clutch is provided with two magnetic fields and each field is of the same general construction, consisting briefly of a back plate 12, formed integrally with a hub 13 keyed upon the shaft 9. To the back plate, on the side facing the armature 4, are secured a pair of rings 14 and 15, the ring 14 carrying the inwardly extending polar projections 16 and the ring 15 carrying outwardly extending polar projections 17, the two sets of poles being arranged in overlapping positions, and held in position against the back plate 12 by bolts or screws 18. The spaces between the pole pieces are filled with non-magnetic material 19, which may be Babbitt metal or other equivalent material.

An annular channel is provided in the face of the back plate 12, and the rings 14 and 15 when placed together form an annular channel for the reception of the annular winding 22 of the clutch.

By this arrangement the exciting coil is entirely surrounded with iron, thus creating a large amount of inductance established when the circuit through the coil is completed. The current through the energizing coil and consequently the strength of the magnetic field will increase slowly and thus prevent sudden acceleration of the driven member of the clutch. Furthermore, the arrangement of the outer and inner rings 14 and 15 provides a field magnet, which is subdivided into a large number of smaller magnetic fields, which oppose each other, thereby causing the residual magnetism to disappear more rapidly than would be the case if a single magnetic circuit were employed. This causes the clutch to release very rapidly when the current has been shut off from the energizing coil. However, even in a construction of this character, the time lag after the current has been cut off is from one to six seconds, and it is frequently desirable to have the clutch release instantaneously, in which case I construct my field as shown in Figs. 5, 6 and 7.

In Fig. 5 is shown an air gap 20 formed between the back plate 12 and the rings 14 and 15 by the interposition of small washers 21 between the rings and the back plate. These washers are held in place by the bolts 18 and are shown in the drawings (for the purpose of illustration) greatly enlarged, as the air gap in practice need only be one sixty-fourth of an inch in thickness. By the insertion of this air gap in this position, a magnetic reluctance is inserted in the magnetic circuit, whereby the residual magnetfor energizing either side of the double magnetic clutch. The segment 90 is connected by conductor 91 with the winding 22 of the clutch. The segment 89 is connected by conductor 92 with one terminal 93 of a single pole overthrow knife switch 94, which switch is connected by conductor 95 with one terminal of the winding 24 of the magnetic clutch. The opposite terminals of both windings of the clutch are connected by conductor 96 with conductor 43. The terminal 93 of the switch is connected by conductor 97 through terminals 98, 98, which are adapted to be bridged together by contact plate 99, carried upon the core of the magnet or solenoid 100, with the other terminal 102 of the switch 94. One terminal of the winding of the magnet 100 is connected with conductor 97 and the opposite terminal is connected by conductor 103 through the push buttons 104, when pressed by the operator, with the conductor 62 and thence across terminals 63, 64 of the overload switch to the opposite main 47 of the supply circuit.

The operation of the device is as follows: The parts being initially as shown in Fig. 3, when it is desired to start the motor the contact arm 37 is moved over terminals 39 and the brush 54 makes contact with the contact segment 56. Circuit is closed from the supply main 40 through contact arm 37, brush 54, contact segment 56, conductor 57, conductor 74, contact lever 69, terminal 72, conductor 75, through winding of the solenoid 59, conductor 60, push buttons 61, conductor 62, contacts 63, 64, through the overload magnet 46, to the opposite side 47 of the supply circuit. The solenoid 59 is thus energized and attracts its core, thereby bridging together contacts 44, 44, through the plate 45. The circuit for the armature of the motor is thus closed and the circuit may be traced from the main 40, contact arm 37, resistance 38, conductor 41, armature 42, conductor 43, contacts 44, 44, and plate 45 to the opposite side 47 of the supply main. Circuit through the shunt field 48 is closed from contact arm 37, through brush 53, segment 50, through conductor 49, the shunt field windings 48 to conductor 43. The attraction of the core of the armature 59 causes the pin 65 to engage and unlock the lever 66, thereby releasing lever 69 and permitting the spring 71 to move said lever to the left, thereby opening the shunt around the resistance 58. The resistance is thus inserted in series with the solenoid 59, and serves to cut down the strength of the current to a value only sufficient to maintain the core in its raised position.

The arm 37, when moved to close the circuit through the resistance 38, also moves the brush 88 into contact with the contact segment 89, and circuit is closed, assuming the switch 94 to be in contact with the terminal 102, and one of the push buttons 104 closed, from the main 40 through the contact arm 37, brush 88, contact segment 89, conductor 92, terminal 93, conductor 97, the winding of the solenoid 100, conductor 103, push buttons 104, conductor 62, the terminals 63, 64, through the overload magnet 46 to the opposite side 47 of the supply main. The winding of the solenoid 100 is thus energized and attracts its core, causing the switch 99 to make contact with the terminals 98, 98. This closes the circuit to the clutch winding 24, and circuit may then be traced from main 40, through contact arm 37, brush 88, segment 89, conductor 92, terminal 93, conductor 97, terminals 98, 98, across bridge 99 to terminal 102, through switch 94, and by conductor 95 through the winding 24 of the magnetic clutch, conductor 96 to conductor 43, and thence as previously traced to the opposite side 47 of the supply main.

The motor having been started as previously described, when the winding 24 of the magnetic clutch is energized it attracts the armature 25, and power is transmitted from the shaft 1 of the motor, through the pinion 3 and the gear wheel 30 to the intermediate shaft 31. As this shaft is revolved, the motion is transmitted by the pinion 33 through the gear 26 on the periphery of the armature 25, which, being energized by the clutch, drives the same and the shaft 9 and this shaft drives, at a greatly reduced speed, the shaft 35, through the medium of the pinion 34 and the gear wheel 36.

By the above described arrangement the machinery is driven at extremely slow speed, and may be started and stopped without stopping the motor, by pressing or releasing the push buttons 104, which closes and opens the circuit through the clutch winding, thereby energizing or deënergizing the clutch. However, if it be desired to drive the machinery continuously at slow speed, the switch 94 is thrown in contact with the terminal 93 and circuit may be traced directly from the main 40 through the contact arm 37, brush 88, contact segment 89, conductor 92, to terminal 93, across the switch 94 to conductor 95, through the winding 24 of the clutch, conductor 96, conductor 43, and thence to the opposite side 47 of the supply circuit, as previously described. By this arrangement, it is necessary, in order to stop and start the machinery, to also stop and start the motor.

Assuming that the arm 37 has been moved so that the contact arm 82 rests upon the buttons 83 and 86, the motor is then running at a prearranged slow speed, also driving the machinery through the gearing as described at a slow speed, and the core of the solenoid 80 occupies the position shown in Fig. 3. In this position the shunt around the armature of the motor is opened. It will be noted likewise that the circuit through the solenoid 80, which was opened when the contact arm 37 was in its initial position, is now closed, and the solenoid 80 is thus connected in a circuit across the terminals of the motor, that is, in a parallel or shunt circuit around the motor armature. The solenoid 80 is so adjusted that when the motor is running at the desired slow speed and below the prearranged maximum limit, the current traversing the said solenoid will be insufficient to raise the core and close the circuit through the contacts 78, 78. When, however, the speed of the motor rises above the prearranged value, the counter electromotive force developed by the armature will be increased to such an extent as to cause an increased current through the parallel path containing the solenoid 80. This increased current flowing through the said solenoid energizes the same and the core thereof is attracted, thereby closing together the contacts 78, 78, by means of the contact plate 79. The shunt circuit around the armature robs it to an extent of the current previously flowing therethrough, and the current through the motor being thus diminished, the speed of the motor will materially fall. As soon as the speed of the motor falls sufficient to cause the solenoid 80 to release its core, the said core drops by gravity and the contact plate 79 is thus moved out of contact with the contacts 78, 78, and the parallel path 77 is thereby opened. In this manner, during this period of operation of the motor, the solenoid 80 automatically closes and opens the parallel path 77 to control the operation of the motor and prevent the same from rising above the prearranged speed.

As the arm 37 is moved to cut out the resistance 38, thereby increasing the speed of the motor, the brush 88 is moved out of contact with the segment 89 and in contact with the segment 90, thereby deënergizing the winding 24 and closing circuit through the winding 22. This circuit may be traced from the main 40, through the contact arm 37, brush 88, segment 90, conductor 91, through the winding 22, conductor 96, to conductor 43, and from thence to the opposite side 47 of the supply main, as previously described. When the winding 22 is energized it attracts the armature member 4 and the power is then communicated directly from the shaft 1, through the clutch of the shaft 9, thereby driving the machinery at a greatly increased speed. When the contact arm is moved to cut out all the resistance 38 from the armature circuit, the resistance 51 is inserted in the field circuit, thereby increasing the speed of the motor.

In Fig. 4 I have shown a modification of my invention, in which I have provided but one armature member 105, which is keyed upon the shaft 9, and two primary members of a clutch are provided. The primary member 106 is loosely mounted upon the shaft 9 and adapted to engage by gear teeth 107 upon its outer periphery with the pinion 33. The primary member 108 is keyed upon the shaft 1, its hub being made integral with that of the pinion 3. By this arrangement it will be seen I have reversed the position of the parts shown in Fig. 1, the clutches 105, 108 occupying the position of the armature members 4 and 25. In other respects the modification is similar.

For the purpose of illustrating the rate of acceleration of the clutch illustrated as compared with other devices, I have shown in Fig. 8 a series of comparative curves. Let it be assumed that two driven machines of different character, each requiring exactly the same amount of horse power when operating at full speed, are provided; the first type of machine to have a very large amount of friction of repose, and the second type to have a relatively small friction of repose. The first type of machine would be well represented by a printing press, whose enormous mass of gears, cams and levers practically absorb the entire applied power in friction. The second type of machine would be well represented by a pump forcing water into a compression tank against a heavy pressure. The power required to overcome the friction in the machinery of this pump would consequently be very small as compared to the total amount of power required to force the water into the compression tank. The rate of acceleration which would result when using the ordinary type of friction clutch or a magnetic clutch of the "ring" type would be very different in these two cases of machinery. The first type would not start to revolve until the turning effort had been made at least three times as great as necessary when the printing press is being driven at full speed. The curves of acceleration would then be represented by a straight line O A, starting from the original of the two coördinates $x$ and $y$, the distance on the axis of $x$ representing time in seconds, and the distance on the axis of $y$ representing the number of revolutions. In starting the pump the torque required would be very much smaller on account of the small amount of friction of repose, and the rate of acceleration would be represented by a straight line O B D, and the pump would consequently attain full speed in a greater length of time on account of being supplied with a smaller amount of accelerating force necessary to start it. As soon as either the printing press or the pump has acquired full speed, their speed curve, of course, becomes parallel to the axis of $x$. In following out the speed curve of the two devices, it will be noticed that the curves O A D and O B D make a very sharp angle when they reach the full speed line. It is this sudden change in the rate of acceleration that causes the undesirable jerk on the driven machinery, the extremely rapid rate of acceleration tending to cause the driven machinery to shoot ahead and exceed the speed of the driven machine. These two speed curves are very similar to that of a falling body. When the body is dropped from a height its speed is uniformly accelerated at the end of each second by the force of gravity and its movement is perfectly smooth until it reaches the ground. I have also shown still another curve, O E G H D, which illustrates the rate of acceleration which would be theoretically obtained with a centrifugal clutch. In this device the co-efficient of friction resulting from the flying weights rubbing against the casing varies as the square of the velocity, which, taken together with the constantly accelerating effect of the change of speed with a constant co-efficient of friction, would make the resulting curve represented by the equation, $v = 3\ t^3$. Such a device will bring the driven shaft up to full speed with great abruptness and meet the line of constant speed almost at right angles, making a terrific jerk on the driven machinery.

The speed curve of the multipolar clutch as described in this application may be compared to that of a falling body, which, after having acquired considerable speed, is then greatly retarded until it alights on the ground with its speed checked entirely. In other words, the curve O C D, which represents the accelerating curve of my device, strikes the line of constant speed tangentially, which means that speed curve O E C D possesses sufficient torque at the beginning of its acceleration to start the printing press and at the same time to accelerate it in as long a time as was required to start the pump with types of clutches which have a constant accelerating force. One of the most important features of my device, therefore, consists in the structure whereby is secured the peculiar form of the curve of acceleration, which starts tangent to the line of rest and ends tangent to the line of constant speed.

It will be noted that a very short interval of time occurs before the magnetism of the ring clutch builds up sufficiently to put in motion the driven shaft, so that the curves O A D and O B D, which correspond to the rate of acceleration when using ring clutches, make a very slight curve with the line of rest and then become almost a perfectly straight line until they strike the line of constant speed. This will also be noted in the curve of acceleration resulting from the use of a centrifugal clutch. It is seen, however, that a much longer interval of time ensues before the driven shaft begins to move, as represented by distance O E G measured on the line of rest. This is due to the fact that the driven shaft begins to acquire motion as the driving shaft is accelerated in speed; but no motion of the driven shaft can occur until the driving shaft has reached a sufficient speed to produce sufficient centrifugal force to overcome the friction of repose of the driven shaft. Having once overcome this friction, the rate of acceleration is extremely rapid, increasing as the cube of the time, and finally meets the line of constant speed almost at right angles.

Referring now to curve O E C D, which represents the curve of acceleration produced by my multipolar clutch, it will be noticed that a time, O E, elapses before sufficient magnetism is developed to start the driven shaft, due, as explained in the specifications, to the large amount of self-induction possessed by this device. The curve then starts off tangentially to the line of rest and as shown by the curve the clutch acquires promptly its maximum torque. The accelerating force then drops off greatly, so that no part of the accelerating curve is ever a straight line. As the curve approaches the line of constant speed, it drops off still more sharply, and finally meets the line of constant speed almost tangentially.

In Fig. 9 is shown a diagrammatic face view of a magnetic field of my clutch. In order that the rapid disappearance of the residual magnetism in the armature member may be more fully understood, it will be assumed that magnetic flux starts from the inwardly projecting pole B and comes up vertically through the plane of the magnet member, as shown by the dots. This flux will then pass into the armature member and divide, half of it passing to the left and half to the right. The left-hand portion will then pass down into outwardly projecting pole A through the air gap 20 into the back plate 12, then, flowing in a right-hand direction, back to the starting point. The right-hand portion of the flux, which divides at B, will pass down through the outwardly projecting pole C, across the air gap 20 into the back plate 12, flowing in a left-hand direction back to the starting point. The armature member, then, has flux flowing in adjacent parts in opposite directions, which meet and pass down through poles A and C without interfering so long as the magnetizing force continues. The moment, however, the magnetizing force is withdrawn, it will be seen that these two oppositely flowing fluxes meet in opposition to each other in the armature disk and destroy each other. They also react to a certain extent on the magnetism of the field projections themselves; but it has been found that the magnetism of the field has a tendency to lag behind and is not instantly disrupted; consequently, the air gap 20 between the back plate 12 and the field rings 14 and 15 has been inserted, which effectually removes this time lag, with the result that the entire device promptly gives up its magnetism. It will be noted in Fig. 9 that the flux in the armature disk takes as many paths as there are poles in the field.

To further illustrate the acceleration of the clutch described herein, let it be assumed that two motors are provided, each one of which will operate a pump delivering water to a compression tank under heavy pressure, one of the motors being connected with the pump through the medium of a magnetic clutch of the "ring" type, and the other connected with a pump through the medium of my clutch. Both motors having been started and brought up to full speed, first start the pump by gradually admitting current to the winding of the ring clutch. As soon as this clutch is supplied with sufficient current, the pump will start and will then rapidly accelerate until full speed is attained, the curve of acceleration being approximately a straight line. Now, deënergize the ring clutch and allow the pump to come to rest, then gradually admit current to the windings of the multipolar clutch until this pump starts. The speed of the pump will then gradually accelerate but will never acquire full speed, probably not reaching more than one-half of full speed, and it will be necessary, in order to reach full speed, to increase the amount of current flowing through the energizing coil. This illustrates the effect of the increased torque possessed by my multipolar clutch in starting, due to the additional effect of the increased current set up in the armature, which of course falls off as the relative speed between the armature and field is reduced. For the purpose of further illustration, let it be assumed that the two motors are connected up in a similar way to a printing press. It will be found that when current is applied gradually to the ring type of clutch until the press starts, the press will assume full speed with great rapidity in much less time proportionately than required by the pump, for the reason that the friction of repose of a printing press is frequently three times as great as the friction of motion. However, if the printing press is started through the medium of my multipolar clutch and the current is introduced into the winding of the clutch gradually until the press starts, the same will accelerate smoothly in speed and will actually acquire full speed without requiring any more current introduced into the winding of the exciting coil. Full speed will be acquired in this case because the increased effect, due to induction in the multipolar clutch, is not as great as the effect of friction, so that any machine used whose friction of repose is more than twice as great as its friction of rest will be brought up to full speed by my multipolar clutch, provided the same is given sufficient power to start the machine and overcome its friction of repose.

It will be seen by the arrangement of this device that the driven machinery may be driven at an extremely slow speed and at a much higher speed by the same motor, means being also provided whereby the driven machinery, when working at an extremely slow speed, may be started or stopped from various points, without stopping or starting the motor. It will also be seen that by the use of a clutch of the character described, when the speed is changed there is no jar or shock to the machinery, due to the sudden acceleration of the speed, but that the speed increases gradually; also when one armature of the clutch is released and the other energized, the release is immediate and one side of the clutch does not pull against the opposite side, thereby straining the parts.

While in the appended claims I have referred to two driving members and a driven member, it will be understood that this arrangement may be reversed and the driving members become the driven members. Also, instead of using a single primary member, I contemplate using two primary members adapted to inductively influence a single secondary member. Moreover, the field magnets of the two clutches, instead of being formed into a unitary structure, may be physically separate and individual structures.

According to some phases of my invention I contemplate using other arrangements of the parts of my variable speed mechanism to obtain the results that are accomplished by the structure illustrated in the drawing. It will be noted that I have so constructed my variable speed mechanism that no part of the gearing or mechanical connections will be driven at an excessive rate of speed when said mechanism is producing a high speed. It will be understood that I use the terms "high speed" and "low speed" in the claims simply to designate two different speeds irrespective of the degree of difference in these speeds.

Having described my invention, what I claim as new and desire to secure by Letters Patent is:

1. A magnetic clutch having a rotatable magnet member and a rotatable armature member, said magnet member having means to attract said armature member and provide for gradual acceleration thereof and also having a reluctance in its magnetic circuit at a point removed from its contacting face to effect an instantaneous release of said members when said magnet member is deprived of current.

2. A magnetic clutch having two members provided with means to cause one of said members, the driven member, to be accelerated through the combined influence of induction and friction, and means to cause an instantaneous release of one of said members from the other when the energizing windings of the clutch are deprived of operating current.

3. A magnetic clutch having two rotatable members provided with means to cause one of said members, the driven member, to be accelerated through the combined influence of induction and friction, and electromagnetic means for causing an instantaneous release of one of said members from the other when the energizing windings of the clutch are deprived of operating current.

4. A magnetic clutch having two rotatable members provided with means to cause one of said members, the driven member, to be accelerated through the combined influence of induction and friction, and means for introducing a magnetic reluctance in the magnet member of the clutch to assist in causing an instantaneous release of one of said members from the other when the energizing windings are deprived of operating current.

5. A magnetic clutch having two rotatable members provided with means to cause one of said members, the driven member, to be accelerated through the combined influence of induction and friction, and means for introducing a magnetic reluctance in the magnetic member of said clutch at a point removed from the contact face of said member to assist in causing an instantaneous release of one of said members from the other when the energizing windings are deprived of operating current.

6. A magnetic clutch having two rotatable members, one of said members comprising a magnet member and being formed of a back plate, an outer ring having a plurality of inwardly extending pole pieces and an inner ring having a plurality of outwardly extending pole pieces secured to said back plate, an energizing coil, and means for introducing a magnetic reluctance between said back plate and said rings.

7. A magnetic clutch having three rotatable members and electromagnetic means to cause attraction between one of said members and either of the two remaining members and to provide for gradual acceleration of the attracted member, said electromagnetic means also including means assisting in effecting an instantaneous release of said members when said electromagnetic means is deprived of current.

8. A magnetic clutch having three rotatable members including field magnets to cause an attraction between one of said members and either of the two remaining members and to provide for gradual acceleration of the attracted member, and means providing said magnets with a reluctance to effect an instantaneous release of said members when deprived of current.

9. A magnetic clutch having three rotatable members including field magnets to effect attraction between one of said members and either of the remaining members, the magnet member having means provided for gradual acceleration of the attracted member, and means providing a magnetic reluctance for the magnet member at a point removed from its contact face for the purpose set forth.

10. A magnetic clutch having three rotatable members provided with means to cause the driven member or members to be accelerated through the combined influence of induction and friction, and electromagnetic means to assist in causing an instantaneous release of said members when the energizing windings are deprived of operating current.

11. A magnetic clutch having three rotatable members provided with means to cause the driven member or members to be accelerated through the combined influence of induction and friction, and means for introducing a magnetic reluctance in the magnet member to assist in causing an instantaneous release of said members when the energizing windings thereof are deprived of current.

12. A magnetic clutch having three rotatable members provided with means to cause the driven member or members to be accelerated through the combined influence of induction and friction, means for introducing a magnetic reluctance in the magnet member of said clutch at a point removed from the contacting face of said member to assist in causing an instantaneous release of said members when the energizing windings are deprived of current.

13. A magnetic clutch having three rotatable members and comprising field magnets for causing the attraction of either of two of said members and the third member, said field magnets each comprising a back plate, a ring having inwardly projecting pole pieces and a ring having outwardly projecting pole pieces secured to said back plate, an energizing coil, and means for introducing a magnetic reluctance between said back plate and said rings.

14. A magnetic clutch having three rotatably mounted members, means to cause an attraction between one of said members and either of the two remaining members, and inherent means to cause a gradual acceleration of speed of a driven member when attracted to a driving member.

15. A magnetic clutch having three rotatably mounted members, means to cause an attraction between one of said members and either of the two remaining members, inherent means for gradually accelerating the speed of a driven member when attracted to a driving member and means for instantly releasing a driven member when an energizing winding of the clutch is deprived of current.

16. A magnetic clutch having three rotatably mounted members, comprising field magnets to cause an attraction between one of said members and the two remaining members, and means for introducing a magnetic reluctance in the magnet member to cause said members to instantly release when the winding thereof are deprived of current, said field magnets being formed of suitable magnetic material entirely surrounding the energizing windings.

17. A magnetic clutch having three rotatably mounted members, comprising field magnets to cause an attraction between one of said members and either of the two remaining members, and means for introducing a magnetic reluctance in the magnet member to cause said members to instantly release when the windings thereof are deprived of current, said field magnets being formed with suitable polar surfaces interposed between the energizing windings and the contact faces of said magnets.

18. A magnetic clutch having three rotatably mounted members provided with means to cause either of said members, the driven member, to be accelerated through the combined influence of induction and friction, and means for instantly releasing said members when the energizing windings of the clutch are deprived of current.

19. A clutch having three rotatably mounted members, means to cause an attraction between one of said members and either of the two remaining members, means for gradually accelerating the speed of one of said members, i. e., the driven member, and electromagnetic means to cause said members to instantly release when the energizing windings of the clutch are deprived of current.

20. A magnetic clutch having three rotatably mounted members, and comprising field magnets for causing an attraction between one of said members and either of the two remaining members, inherent means for gradually accelerating the speed of one of said members, i. e., a driven member, when so attracted, and means for introducing magnetic reluctance in the field circuit.

21. A magnetic clutch having three rotatably mounted members, and comprising field magnets for causing an attraction between one of said members and either of the two remaining members, and means for gradually accelerating the speed of one of said members, i. e., a driven member, when so attracted, said field magnets each comprising a back plate, a ring having inwardly projecting pole pieces and a ring having outwardly projecting pole pieces, secured to said back plate, and means for introducing a magnetic reluctance between said back plate and said ring.

22. The combination with a driving mechanism and a driven mechanism, of a magnetic clutch having two relatively moving driving members and a driven member adapted to engage either of said driving members and inherent means to gradually accelerate the speed of the driven member when so engaged.

23. The combination with the driving machinery, of a magnetic clutch to connect the same with the machinery to be driven, said clutch having two relatively moving driving members and a driven member adapted to engage either of the same, inherent means to gradually accelerate the speed of the driven member when engaged with one of the driving members, and means to instantly release the driven member from one driving member when it engages the other.

24. The combination with the driving machinery, of a magnetic clutch to connect the same with the machinery to be driven, said clutch having a member adapted to be driven at a relatively slow speed, and a member adapted to be driven at a relatively high speed, a member adapted to engage either of said members, and inherent means for gradually accelerating the speed of said third member.

25. The combination with the driving machinery, of a magnetic clutch to connect the same with the machinery to be driven, said clutch having a member adapted to be driven at a relatively slow speed, and a member adapted to be driven at a relatively high speed, and a member adapted to engage either of said members, inherent means for gradually accelerating the speed of said third member, and means to cause the same to become instantly released from one of said members when connected with the other.

26. The combination with a motor, of a double magnetic clutch associated therewith, a rheostat, a separate electrically operated switch for said motor and one side of said clutch, and means to control said switches and the opposite side of said clutch from the rheostat.

27. The combination with a motor, of a double magnetic clutch associated therewith, a rheostat, a solenoid switch for said motor and one side of said clutch controlling the continuity of their circuits, and means for controlling said switches and the other side of said clutch from said rheostat.

28. The combination with a motor and the machinery to be driven of a double magnetic clutch associated therewith, a rheostat, means for controlling said motor and said clutch from the rheostat, and auxiliary means for deënergizing one side of said clutch without stopping the motor.

29. The combination with a motor, of a double magnetic clutch, a rheostat having a movable element, said element in one position serving to cause the operation of said motor, and one side of said clutch, and upon continued movement to increase the speed of said motor and cause the operation of the other side of said clutch, and render inoperative said first side of said clutch.

30. The combination with a primary clutch member having an annular winding or windings and a plurality of circumferentially disposed polar surfaces, of means for introducing a magnetic reluctance between said polar surfaces and the support therefor, and a secondary member inductively influenced by said primary member.

31. A variable speed mechanism, comprising an electric motor having a driving shaft, a driven shaft, a set of gears including a pinion fixed on said driving shaft, and a gear revolubly supported on said driven shaft, an electromagnetic clutch on said driven shaft in operative relation to said gear, and a controlling device having a movable element for varying the electrical conditions in said motor, said movable element being adapted, during part of its movement, to maintain said clutch energized.

32. An electromagnetic clutch having rotatable members, said members having contacting faces extending substantially transversely to the axis of said members, and a non-magnetic material completely interrupting the field of said clutch and so arranged that the contacting faces of said members may make direct mechanical contact and thus eliminate interruption of the magnetic circuit between said faces.

33. In combination a driving shaft, a driven shaft, a magnetic clutch having three members, one fixed to said driving shaft, a second fixed to said driven shaft and a third loosely mounted on said driven shaft and gearing connecting said third member to said driving shaft, said clutch being operable to first connect said driven shaft to said driving shaft through said second and third members for starting and then through said first and second members for normal operation.

34. In combination, a motor having a driving shaft, a driven shaft, a magnetic clutch having three members, one fixed to said driving shaft, a second fixed to said driven shaft and a third loosely mounted on said driven shaft, relatively low-speed gearing connecting said third member to said driving shaft and the common controller for said motor and said magnetic clutch operable to start said motor and energize said clutch to connect said second and third members and further operable to connect said first and second members and accelerate the motor.

In witness whereof, I have hereunto subscribed my name in the presence of two witnesses.

HENRY H. CUTLER.

Witnesses:
M. R. ROCHFORD,
W. PERRY HALM.